United States Patent [19]

Koivula et al.

[11] Patent Number: 5,608,971
[45] Date of Patent: Mar. 11, 1997

[54] APPARATUS AND PROCEDURE FOR THE MOUNTING OF A JOURNAL BOX

[75] Inventors: Markku Koivula; Ahti Lukkaroinen, both of Urjala, Finland

[73] Assignee: KCI Konecranes International Corporation, Hyvinkaa, Finland

[21] Appl. No.: 352,161

[22] Filed: Dec. 1, 1994

[30] Foreign Application Priority Data

Dec. 2, 1993 [FI] Finland ................................. 935411

[51] Int. Cl.⁶ ................................................. B23P 15/00
[52] U.S. Cl. ...................... 29/898.07; 29/434; 384/549; 384/537; 384/559
[58] Field of Search ............................... 29/898, 898.07, 29/434; 384/549, 537, 559, 562

[56] References Cited

U.S. PATENT DOCUMENTS

| | | | |
|---|---|---|---|
| 924,387 | 6/1909 | Shirley | 384/559 |
| 2,396,247 | 3/1946 | Chadwick et al. | 384/562 |
| 3,890,020 | 6/1975 | Thomas | 384/559 |
| 4,776,074 | 10/1988 | Suzuki et al. | 29/434 |
| 4,883,371 | 11/1989 | Matsumoto | 384/559 |
| 5,471,732 | 12/1995 | Yumiki et al. | 29/898.07 |

*Primary Examiner*—Irene Cuda
*Assistant Examiner*—Marc W. Butler
*Attorney, Agent, or Firm*—Birch, Stewart, Kolasch & Birch, LLP

[57] ABSTRACT

The invention relates to an apparatus and a procedure for mounting a bearing wheel journal box (6) in a supporting structure. The supporting structure consists of a supporter side plate (4) having a seating (21) for the journal box (6). The seating has an opening delimited by corners (23,25). On the periphery of the journal box (6) there is an area (12) of reduced thickness, in the region of which the outer measure (S) of the journal box is smaller than the distance (W) between the corners (23,25) of the seating (21), while at other points the outer measure (D) of the journal box is larger than said distance (W). The journal box (6) is inserted into the seating (21) by holding the reduced-thickness portion (12) against the edge (23) of the opening and then turned into a desired position in the seating (21).

7 Claims, 3 Drawing Sheets

APPARATUS AND PROCEDURE FOR THE MOUNTING OF A JOURNAL BOX

The present invention relates to an apparatus for mounting a journal box, and to a procedure for mounting a journal box.

BACKGROUND OF THE INVENTION

The bearing wheel of a crane is mounted with a bearing in a supporter which, in the working position, rests on the bearing wheel. During installation and possibly during transport, the bearing and the bearing wheel must be properly mounted in the end plate of the supporter.

SUMMARY OF THE INVENTION

In previously known solutions, the bearing wheel is mounted in the supporter by using a mounting collar fitted around is the journal box and attached to the supporter. A solution like this requires extra parts and extra work during installation.

The object of the invention is to achieve a new procedure and a new arrangement for mounting the bearing wheel during installation and transport which does not require specific tools, means or operations during installation. To achieve this, the apparatus of the invention is characterized by the features presented in the characterization part of claim 1. Correspondingly, the procedure of the invention for the mounting of a journal box is characterized by the features presented in the characterization part of claim 5. Other embodiments of the invention are defined in the subclaims.

In the solution of the invention, the bearing wheel is mounted between the bearing surfaces of the supporter by means of its journal box without separate supporting parts. The bearing wheel can be mounted in position quickly and in a simple manner. Eccentric journal boxes used with the bearing wheel are easy to turn and adjust even on site when the bearing wheel has been lifted up and is reliably supported by the supporting structures during adjustment.

BRIEF DESCRIPTION OF THE INVENTION

In the following, the invention is described by the aid of an embodiment by referring to the drawings, in which FIG. 1 presents the supporting structure as seen from the end of the bearing wheel shaft.

FIG. 2 presents a cross-section of the supporting structure

FIG. 3 presents the supporting structure of FIG. 1 with the journal box in the position in which it is inserted; and FIG. 4 presents the supporting structure similar to that of FIG. 1 except that two segments are removed from the journal box.

DETAILED DESCRIPTION OF THE INVENTION

Figure 1:
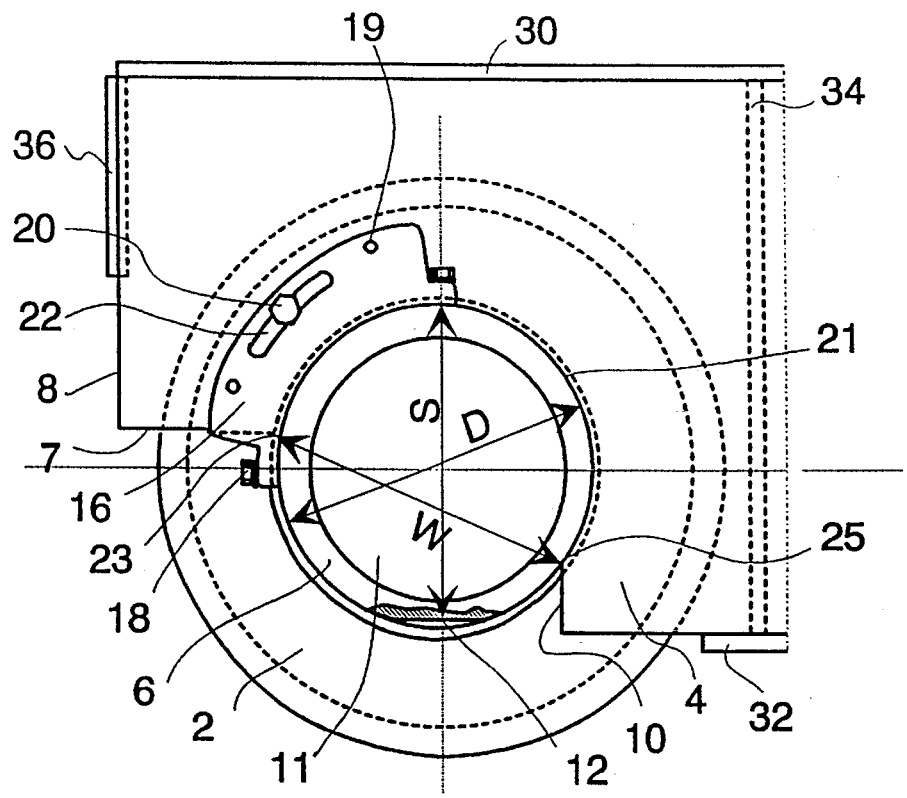
Figure 2:
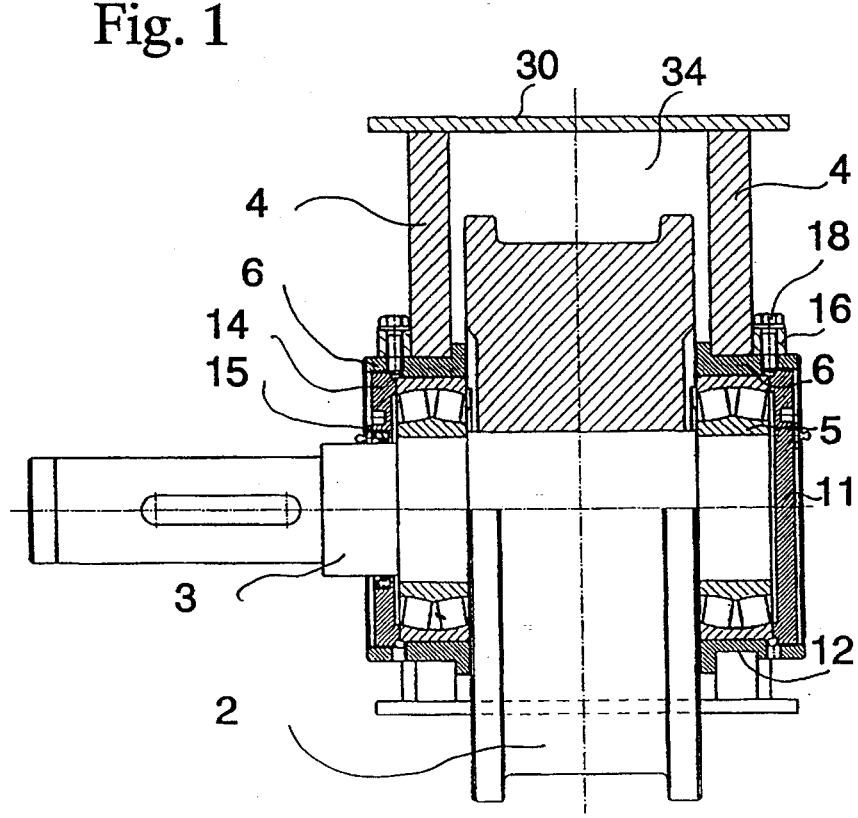

FIG. 1 presents a bearing wheel 2 of a crane and its supporting structure as seen from the direction of the shaft 3, and FIG. 2 presents a cross-section of the bearing wheel along a plane passing through the shaft of the bearing wheel. The side plate, i.e. the end plate 4, of the crane supporter rests on the shaft 3 of the bearing wheel 2, the forces being transmitted by the bearing wheel bearings and their journal boxes 6. The side plates 4 are joined by a cover plate 30, a bottom plate 32 and intermediate plates 34 and 36. Fitted between the journal box 6 and the shaft 3 are bearings 5. The journal box 6 on the shaft end side of the wheel is covered with a threaded cap 11. Similarly, the journal box on the side facing the motor is closed with a threaded cap 14, which is provided with a sealing 15 fitted against the shaft 3. The portion of the supporter side plate extending past the bearing wheel is so formed that its lower edge 7 extends at the end 8 of the supporter to a level slightly above the centre axis of the bearing wheel. Below the centre axis of the bearing wheel, the supporter side plate is so shaped that the vertical edge 10 of the side plate end is below the centre axis of the bearing wheel. Formed between the lower edge 7 and the vertical edge 10 is a curb having the shape of a circular arc and constituting a seating 21 which forms a bearing surface for the journal box 6. The seating is delimited at the end points of the curb by corner 23 at the lower edge 7 on one hand and corner 25 at the vertical edge on the other hand. The seating 21 in the side plate is so made that it surrounds the journal box 6 of the bearing through a distance above 180 degrees along the circumference of the journal box. The bearing area of the seating has the same shape as the outer surface of the journal box which is fitted against it. Thus, the side plate has in its lower corner a gap for the journal box 6, a gap whose width W, equalling the distance between corners 23 and 25, is slightly less than the outer measure or external diameter D of the journal box 6 of the bearing wheel. The material thickness of the journal box at its lower edge (partial section in FIG. 1) has been reduced by removing a segment from the periphery of the journal box, forming a level portion 12. After the portion has been milled off, the dimension from the midpoint of the face where the segment has been removed through the center of the journal box to the outer periphery opposite the face is such that the outer measure or diameter S of the journal box at the level portion 12 is smaller than the width W of the gap formed in the side plate 4, as well as the diameter of an unmilled portion of the journal box.

The bearings on opposite sides of the bearing wheel are of an identical design. Also, the milled level portion is preferably placed at the same point in both journal boxes. In applications where eccentric journal boxes are used and the bearing wheel alignment is adjusted by turning the eccentric journal box to the required position, the alignment markings used as an aid in the adjustment of the bearing wheel alignment can be made identically on both journal boxes. The supporter side plates are provided with corresponding alignment markings, with the aid of which the eccentric journal boxes can be adjusted to the required positions. Thus, the journal boxes on opposite sides of the bearing wheel are turned to positions differing from each other. In the final position, the reduced-thickness portion of the journal box preferably lies opposite the gap formed in the side plate, so that the outer surface of the journal box is in contact with the seating over the entire length of the curb of the seating. The journal boxes are fastened by means of anti-torsion plates 16 which are fixed with screws 18 to the periphery of the journal boxes and which, after the alignment, are interlocked with the side plate by means of a locking pin 19 and securing bolts 20 fitted in slots 22.

As illustrated by FIG. 2, it is sufficient to make a level portion 12 in the axial direction of the journal box only in that part which lies opposite to the edge of the side plate.

Figure 3:
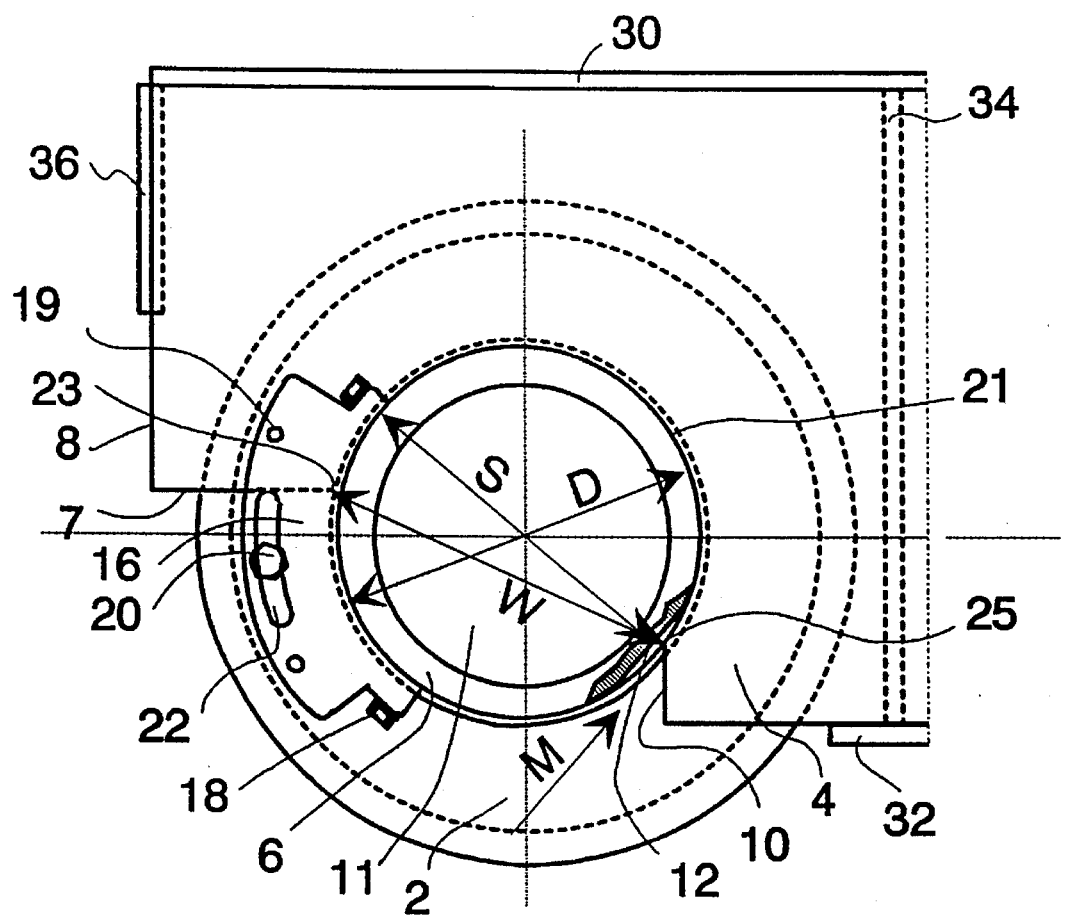

FIG. 3 shows a bearing wheel and its supporting structure as presented in FIG. 1, in the position where the journal box is inserted into the seating. To mount the bearing wheel, the wheel is moved in through the gap in the side plate in such a way that the direction of the level portions 12 of the journal boxes 6 corresponds to the direction of the mounting movement (arrow M), in which position the journal boxes can be moved in through the gap. When the periphery of the journal box touches the bearing surface of the seatings 21 formed in the side plates, the journal box 6 is turned to a position where the level portion 12 of the journal box lies opposite the gap in the side plate, i.e. to the position shown in FIG. 1. When eccentric journal boxes are used, the alignment is adjusted by turning the journal box through the required angle, whereupon the journal box 6 is locked in place with the locking pin 19.

Figure 4:
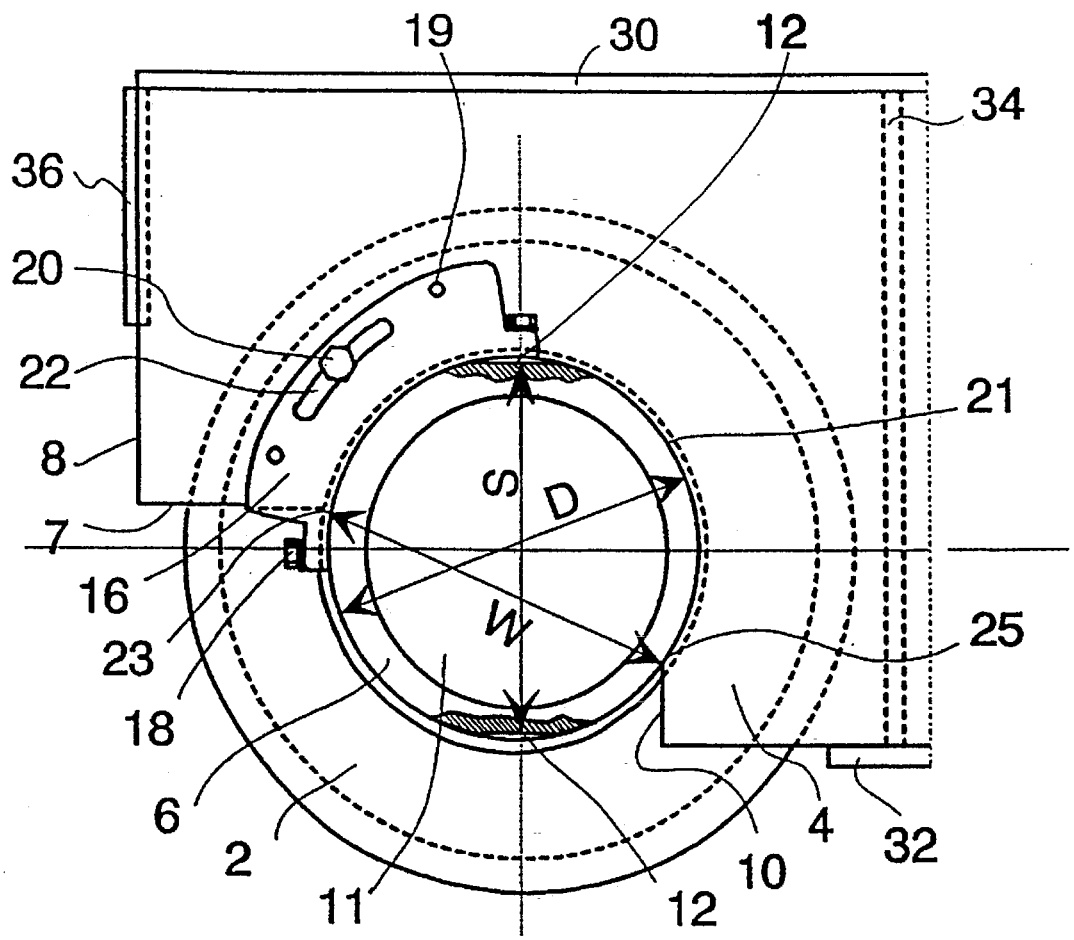

In an embodiment of the invention, the journal box is provided with two level surfaces on opposite sides of its periphery (FIG. 4). In this solution, the thickness of a segment milled off is smaller and, correspondingly, the material thickness of the journal box in the area of reduced thickness is larger than in the case of a journal box with a single level surface. On the other hand, this also allows the arc of the interior curb of the seating to be made longer and, correspondingly, the gap in the side plate to be made smaller for a given journal box diameter. The distance between the midpoints of the opposite faces through the center of the journal box is smaller than the journal box diameter D.

In the above, the invention has been described by the aid of one of its embodiments. However, the presentation is not to be regarded as limiting the sphere of patent protection, but the embodiments of the invention may vary within the limits of the following claims.

We claim:

1. A method for mounting a bearing wheel (2) and a journal box (6) attached thereto to a supporting structure including a side plate (4) having a seating (21) for an outer periphery of the journal box (6), in which method a gap delimited by a first corner (23) and a second corner (25) is formed on a curb of the seating (21), through which gap the journal box (6) is fitted into the seating (21), comprising the steps of:

segmenting the outer periphery of the journal box to one side of a journal box diameter (D) to form an outer segment and a central segment;

removing the outer segment material radially outward of an interface between the segments, the distance from the midpoint of the interface through the center of the journal box to the outer periphery opposite the interface being a distance S which is smaller than the journal box diameter D;

inserting the journal box into the seating with the interface substantially parallel to the direction of insertion; and rotating the journal box such that the interface does not lie opposite the corners.

2. The method according to claim 1, wherein the segment material removing step is machining by which a planar surface is formed.

3. A method for mounting a bearing wheel (2) and two journal boxes (6) attached in axially spaced relationship thereto to a supporting structure including two side plates (4), each said side plate having a seating (21) for an outer periphery of one of the journal boxes (6), in which method a gap delimited by a first corner (23) and a second corner (25) is formed on a curb of the seating (21), through which gap each of the journal boxes (6) is fitted into the corresponding seating (21), comprising the steps of:

segmenting the outer periphery of each of the journal boxes to one side of a journal box diameter (D) to form an outer segment and a central segment;

removing the outer segment material radially outward of an interface between the segments of each of the journal boxes, the distance from the midpoint of the interface through the center of the journal box to the outer periphery opposite the interface being a distance S which is smaller than the journal box diameter D;

inserting each of the journal boxes into a corresponding seating with the interface substantially parallel to the direction of insertion; and rotating the journal box such that each of the interfaces do not lie opposite the corners of the corresponding side plate.

4. The method according to claim 2, wherein the segment material removing step is machining by which planar surfaces are formed.

5. The method according to claim 2, wherein the two journal boxes are substantially identical.

6. A method for mounting a bearing wheel (2) and a journal box (6) attached thereto to a supporting structure including a side plate (4) having a seating (21) for an outer periphery of the journal box (6), in which method a gap delimited by a first corner (23) and a second corner (25) is formed on a curb of the seating (21), through which gap the journal box (6) is fitted into the seating (21), comprising the steps of:

segmenting the outer periphery of the journal box to a first side and a second side of a journal box diameter (D), said first side and said second side being opposite sides, to form an first outer segment, a second outer segment and a central segment disposed between said first and second outer segments;

removing both the first outer segment material radially outward of a first interface between the first outer segment and the central segment and the second outer segment material radially outward of a second interface between the second outer segment and the central segment, the distance between the midpoints of the interfaces passing through the center of the journal box being a distance S which is smaller than the journal box diameter D;

inserting the journal box into the seating with at least one of the first and second interfaces substantially parallel to the direction of insertion; and rotating the journal box such that the first and second interfaces do not lie opposite the corners.

7. The method according to claim 6, wherein the segment material removing step is machining by which planar surfaces are formed.

* * * * *